United States Patent [19]
Hofmann et al.

[11] Patent Number: 6,035,986
[45] Date of Patent: Mar. 14, 2000

[54] PLATE CLUTCH

[75] Inventors: Klaus Hofmann, Leutershausen; Thomas Rudolf, Dettelbach; Horst Friedrich, Aidhausen; Claus Orth, Mönchstockheim; Werner Selzam, Wipfeld; Jürgen Loibersbeck, Grafenrheinfeld, all of Germany

[73] Assignee: Mannesmann Sachs AG, Schweinfurt, Germany

[21] Appl. No.: 09/146,546

[22] Filed: Sep. 3, 1998

[30] Foreign Application Priority Data

Sep. 4, 1997 [DE] Germany .......................... 197 38 597

[51] Int. Cl.[7] ................................................. F16D 13/72
[52] U.S. Cl. ..................... 192/70.12; 192/70.19; 192/113.24
[58] Field of Search ............... 192/70.12, 70.19, 192/113.2, 113.24; 411/424

[56] References Cited

U.S. PATENT DOCUMENTS

| | | | |
|---|---|---|---|
| 1,707,843 | 4/1929 | Byerlein | 129/113.24 |
| 1,731,416 | 10/1929 | Gurney | 192/113.24 |
| 1,979,880 | 11/1934 | Heinrich | 192/70.12 X |
| 4,846,326 | 7/1989 | Tilton et al. | 192/70.19 |
| 5,301,779 | 4/1994 | Nash | 190/70.2 |
| 5,722,524 | 3/1998 | Mizukami et al. | 192/70.12 |

FOREIGN PATENT DOCUMENTS

| | | |
|---|---|---|
| 0 797 016 | 9/1997 | European Pat. Off. . |
| 57-008335 | 1/1982 | Japan . |

*Primary Examiner*—Richard M. Lorence
*Attorney, Agent, or Firm*—Cohen, Pontani, Lieberman & Pavane

[57] ABSTRACT

The invention is directed to a plate clutch with a housing having a front cover and axially projecting feet. The feet are provided with longitudinal bores through which fastening screws are guided. The fastening screws are constructed as expansion screws with a middle region which is reduced in diameter. The feet are provided with radial ventilation openings in the reduced diameter region of the fastening screws.

3 Claims, 2 Drawing Sheets

6,035,986

PLATE CLUTCH

BACKGROUND OF THE INVENTION

1. Field of the Invention

The invention is directed to a plate clutch having inner and outer plates and a housing with a front cover, wherein said housing comprises radially projecting feet for engaging the outer plates and said feet have longitudinal bores for receiving fastening screws.

2. Description of the Related Art

A prior art plate clutch is known, for example, from U.S. Pat. No. 5,301,779. By arranging axially projecting feet at the front cover of the housing of this type of plate clutch construction, it is possible to provide openings between these feet along the circumference for the circulation of air. The feet themselves are exposed to high thermal stresses because of their relatively compact constructional form and due to the fact that they are screwed directly to the flywheel.

SUMMARY OF THE INVENTION

It is the object of the present invention to provide a plate clutch having a housing with longitudinally extending feet for receiving fastening screws with improved heat removal in the region of the fastening screws.

This object is met, according to the invention, by a plate clutch housing provided with fastening screws constructed as expansion screws inserted into longitudinal bores through axial extending feet of the housing. The fastening screws are constructed with guide regions at the axial end areas of the longitudinal bores of the housing and with a reduced diameter region between the guide regions. Radial openings are arranged in the feet of the housing substantially coinciding with the reduced diameter regions of the fastening screws. The construction of the fastening screws as expansion screws with a reduced diameter between guide regions and the arrangement of radial openings in the feet in the region of reduced diameter, permit a flow of air through the feet for cooling the clutch housing in the area of the feet by the air flowing through. An improved ventilation of this type is especially advantageous in plate clutches with carbon plates which are used in car racing and which release a large amount of frictional heat in a sudden manner at least during the starting process. As a result of the inventive arrangement, not only is an improved radial ventilation produced, but the surface area of the housing is increased thereby improving heat removal through both convection and radiation. At the same time, the mass and the mass moment of inertia of the housing is reduced, which results in improved shifting behavior of the plate clutch. The fastening screws which are also subjected to heat from the flywheel are also ventilated.

Instead of being one continous opening, the radial openings may be divided into at least two rows in the axial direction and separated from one another by at least one crosspiece or web. The feet which must transmit torque to the outer plates as well as receive the axial force support of the main clutch spring are maintained stable by at least one such web in every foot.

According to a further feature of the invention, the at least one web is arranged at an axial position such that it is radially aligned with one of the outer plates. This arrangement ensures that neither the conducting of air nor the removal of friction is impeded by a web.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
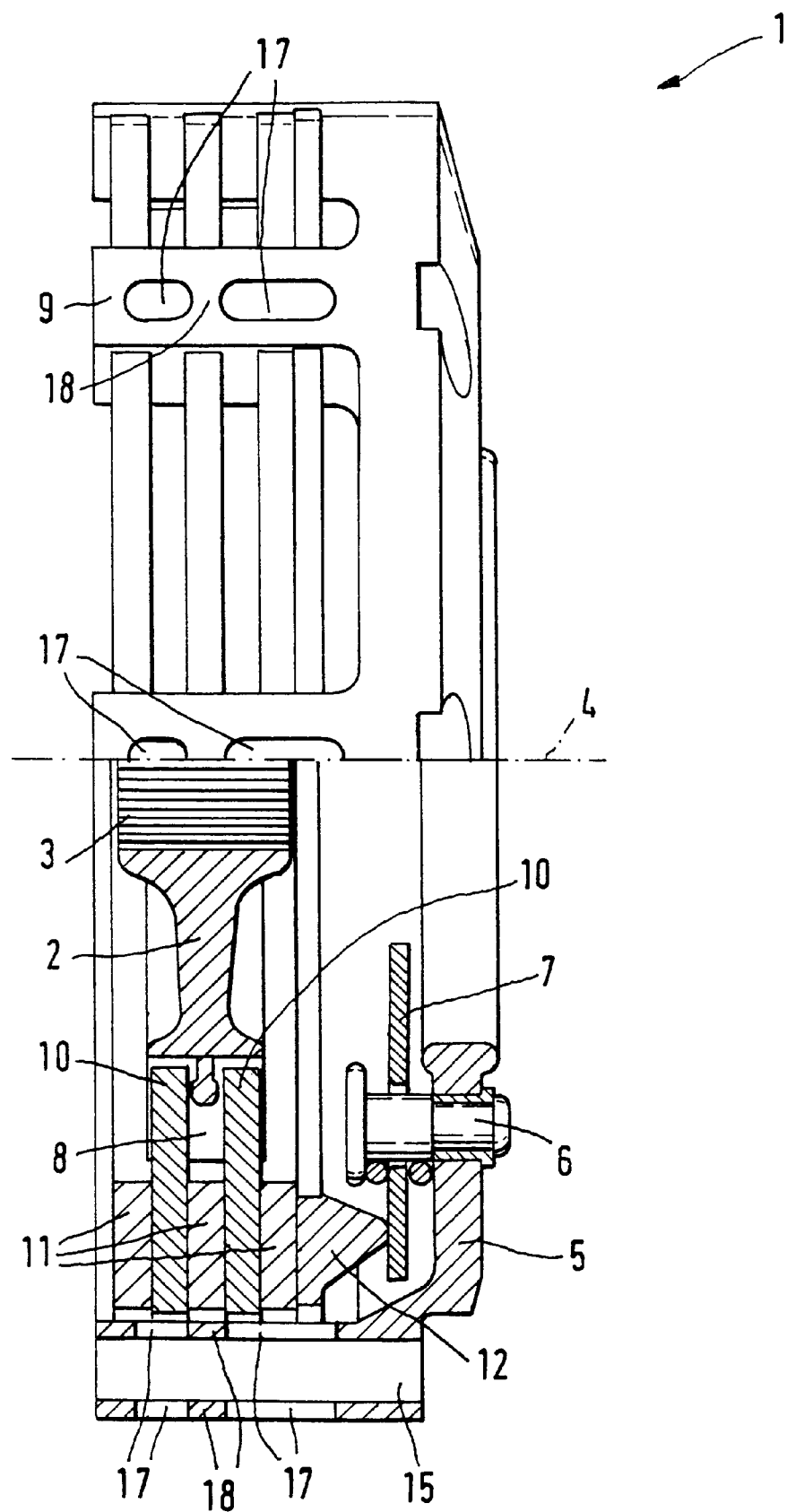
FIG. 1 is a partial longitudinal sectional view of a plate clutch according to an embodiment of the present invention.
Figure 3:
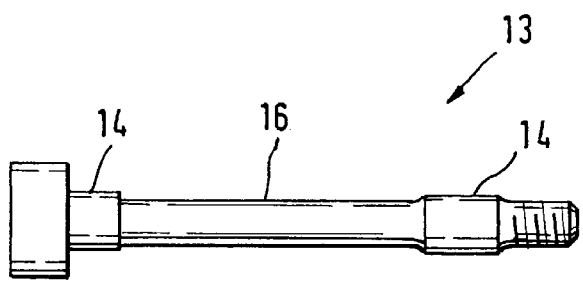
FIG. 3 shows an embodiment of a fastening screw of the for use with the plate clutch of FIG. 1.

Referring to FIG. 1, a plate clutch 1 according to an embodiment of the present invention is arranged concentric to an axis of rotation 4 and has a hub 2 which is secured so as to be fixed with respect to rotation relative to a toothing 3 but so as to be axially displaceable on a gear shaft (not shown). The hub 2 has an outer toothing 8 toward the radial outer side. A plurality of inner plates 10—two are shown in FIG. 1—engage in the outer toothing 8 so as to be fixed with respect to rotation relative to it. A plurality of outer plates 11 are alternately stacked with the inner plates 10 along the axis of rotation 4 and are enclosed by the feet 9 of the front cover 5. Corresponding outer teeth on the outer plates 11 engage the feet 9 to produce a rotational connection. The front cover 5 is provided on its inner side with a plurality of spacer pins 6 which are arranged concentric to the axis of rotation 4 and at which a diaphragm spring 7 is supported. The radial outer area of the diaphragm spring 7 acts via a pressure plate 12 on the inner and outer plates 10, 11. The pressure plate 12 is likewise supported so as to be fixed with respect to rotation via the axially projecting feet 9. The plate clutch 1 is connected to a flywheel, not shown, which is located on the side of the plate stack 10, 11 located opposite to the front cover 5 (the left side of FIG. 1). This flywheel is driven by the internal combustion engine. The feet 9 are provided with axially continuous longitudinal bores 15 for receiving fastening screws 13 in accordance with FIG. 3. These fastening screws 13 are constructed as expansion screws such that they have two axially spaced guide areas 14 by which they are guided in the longitudinal bore 15 and are provided with a reduced diameter region 16 positioned axially between the guide regions 14. The fastening screws 13 may have a fixedly arranged head at one end and are outfitted at the other end with a thread for receiving a nut. The clutch is released in that a clutch release system acts on the radial inner end region of the diaphragm spring 7, so that the diaphragm spring 7 is swiveled around the bearing of the spacer pins 6 and its clamping force relative to the pressure plate 12 is thus cancelled in its radial outer area. The feet 9 of the clutch housing are provided with radial openings 17 substantially in the area of reduced diameter 16 of the fastening screws 13, for permitting a ventilation of the clutch interior during the operation of the internal combustion engine by the rotation of the clutch housing, wherein this ventilation is also effective in the area of the feet 9 and the fastening screws 13. The radial openings 17 are divided into rows along the axial direction which are separated from one another by at least one web 18. An axial position of the web 18 is arranged in such a way that it is radially aligned with one of the outer plates 11. In this way, it is ensured that the radial flow of air and the removal of abrasion of the plates is not hindered.

Figure 2:
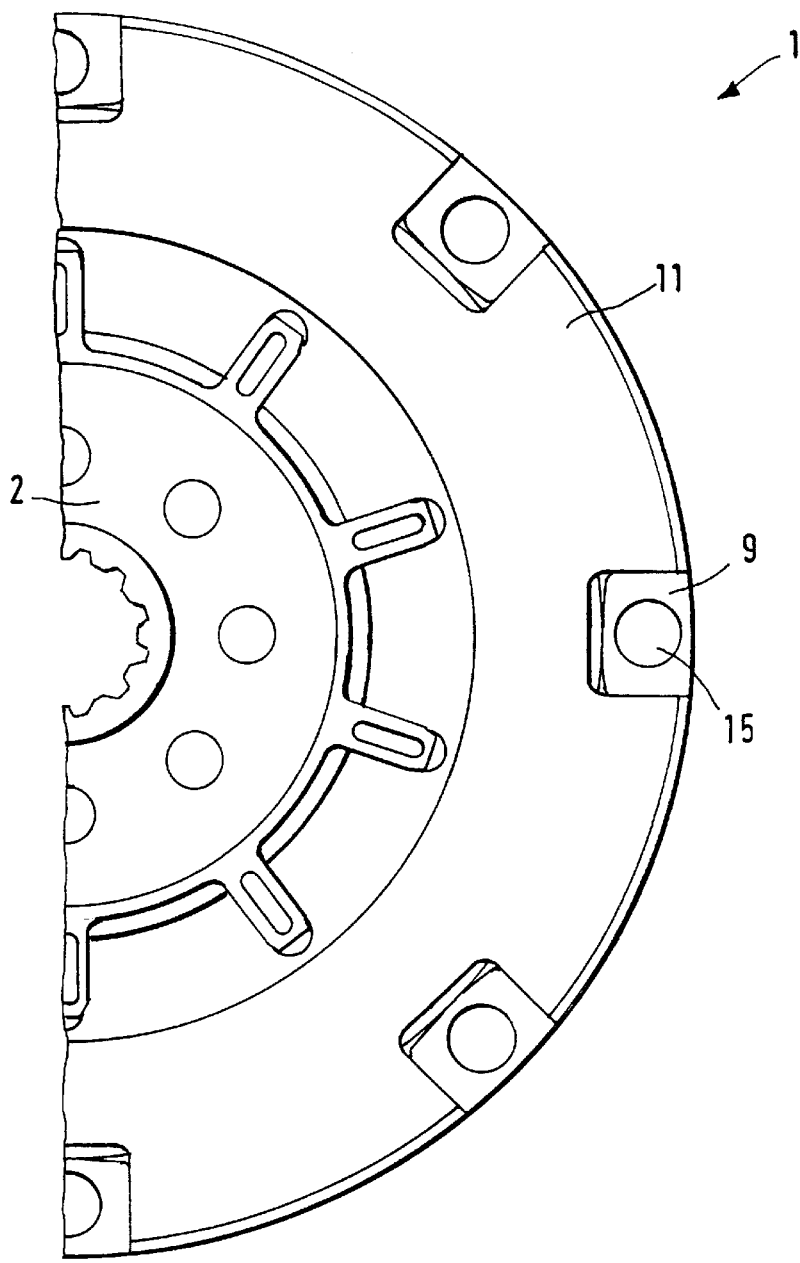
FIG. 2 shows a partial view of the clutch as viewed from the side of the plate clutch connectable to a flywheel.

FIG. 2 shows the side of the plate clutch 1 which faces the flywheel. FIG. 2 shows the flywheel-side outer plate 11 and a front view of the feet 9 with their longitudinal bores 15 and the hub 2.

The invention is not limited by the embodiments described above which are presented as examples only but can be modified in various ways within the scope of protection defined by the appended patent claims.

We claim:

1. A plate clutch for a motor vehicle, comprising:
   a plurality of inner plates and outer plates alternately stacked along an axis of rotation of said plate clutch;
   a housing having a cover plate with axially projecting feet, wherein said axial projecting feet engage a corresponding toothing on said outer plates for transmitting a torque from said housing to said outer plates and wherein each said axial projecting feet has a longitudinal bore;
   fasting screws inserted in said londitudinal bores of said axially projecting feet for connecting said housing to a flywheel of said motor vehicle, each said fastening screws comprising guide regions in the axial end areas of said longitudinal bores and a reduced diameter region between said guide regions; and
   said axially projecting feet further comprising radial openings arranged through said longitudinal bore and substantially coinciding with said reduced diameter regions of said fastening screws.

2. The plate clutch of claim 1, further comprising a web dividing said radial openings into at least two rows in the axial direction.

3. The plate clutch of claim 2, wherein an axial position of said web is arranged in alignment with one of said outer plates.

* * * * *